United States Patent [19]
Roe

[11] Patent Number: 5,934,476
[45] Date of Patent: Aug. 10, 1999

[54] VACUUM ROTARY FILTRATION APPARATUS

[76] Inventor: Philippe Roe, P.O. Box 464 High St., Hope, N.J. 07844

[21] Appl. No.: 08/701,073

[22] Filed: Aug. 21, 1996

[51] Int. Cl.$^6$ ...................................................... B07B 9/00
[52] U.S. Cl. .............................. 209/23; 209/143; 209/148
[58] Field of Search .................................. 209/21, 22, 23, 209/24, 25, 142, 143, 146, 147, 148

[56] References Cited

U.S. PATENT DOCUMENTS

| | | |
|---|---|---|
| 334,777 | 1/1886 | Hulse . |
| 1,573,373 | 2/1926 | Cassell et al. . |
| 2,094,438 | 9/1937 | Watson . |
| 2,477,935 | 8/1949 | Miller ......................................... 209/23 |
| 2,528,877 | 11/1950 | Goldberg . |
| 2,785,798 | 3/1957 | Walker . |
| 3,113,733 | 12/1963 | Carlson . |
| 3,409,139 | 11/1968 | Jackson et al. . |
| 3,532,276 | 10/1970 | Dunn ...................................... 209/23 X |
| 4,447,249 | 5/1984 | Kopena . |
| 4,522,726 | 6/1985 | Berry et al. . |
| 4,529,509 | 7/1985 | Nilsson . |
| 4,551,248 | 11/1985 | Lenac . |
| 5,073,264 | 12/1991 | Immonen et al. . |
| 5,078,878 | 1/1992 | Charette . |
| 5,106,488 | 4/1992 | Jonasson . |
| 5,509,379 | 4/1996 | Hoeschen . |

FOREIGN PATENT DOCUMENTS

| | | |
|---|---|---|
| 1 197 735 | 7/1965 | Germany . |
| 240780 | 5/1946 | Switzerland ............................. 209/24 |

OTHER PUBLICATIONS

Catalog, Delta Ducon, Pneumatic Conveying Systems and Components, Jun. 1996.
Catalog, PIAB, Vaccum Conveying, No. 19, 1995.

*Primary Examiner*—Tuan N. Nguyen
*Attorney, Agent, or Firm*—William Squire

[57] ABSTRACT

A rotor assembly includes a shaft and a plurality of radially outwardly extending vanes surrounded by a circular cylinder. A truncated conical segment screen is in each compartment formed by the vanes dividing each compartment into inner and outer subcompartments. Apertured top and bottom face plates are respectively above and below the vanes. A housing includes top and a bottom plates to which the rotor assembly shaft is rotatably secured. A material inlet hose and dust exhaust pipe are attached to the top plate and are in simultaneous successive fluid communication with each outer and inner subcompartments respectively as they rotate. A discharge port is in the bottom plate for discharging separated material in an outer subcompartment downstream from the outer subcompartment then receiving material from the inlet hose. The top and bottom plates are spaced a small gap from the rotor face plates to provide fluid seals therebetween to fluid isolate the compartments from each other.

21 Claims, 2 Drawing Sheets

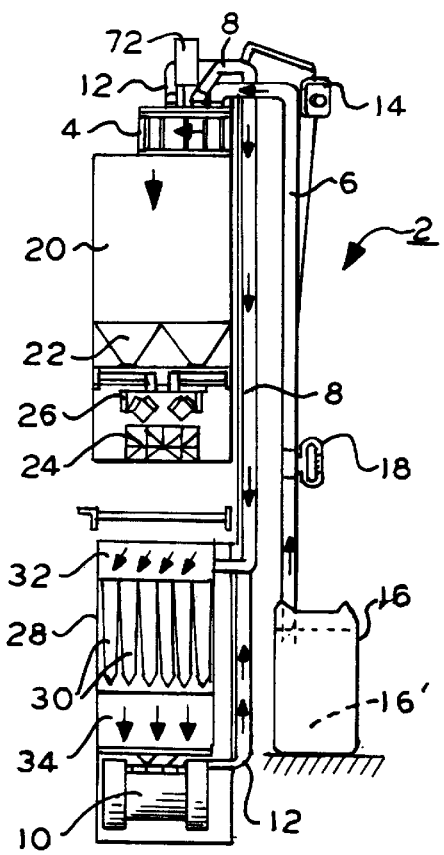
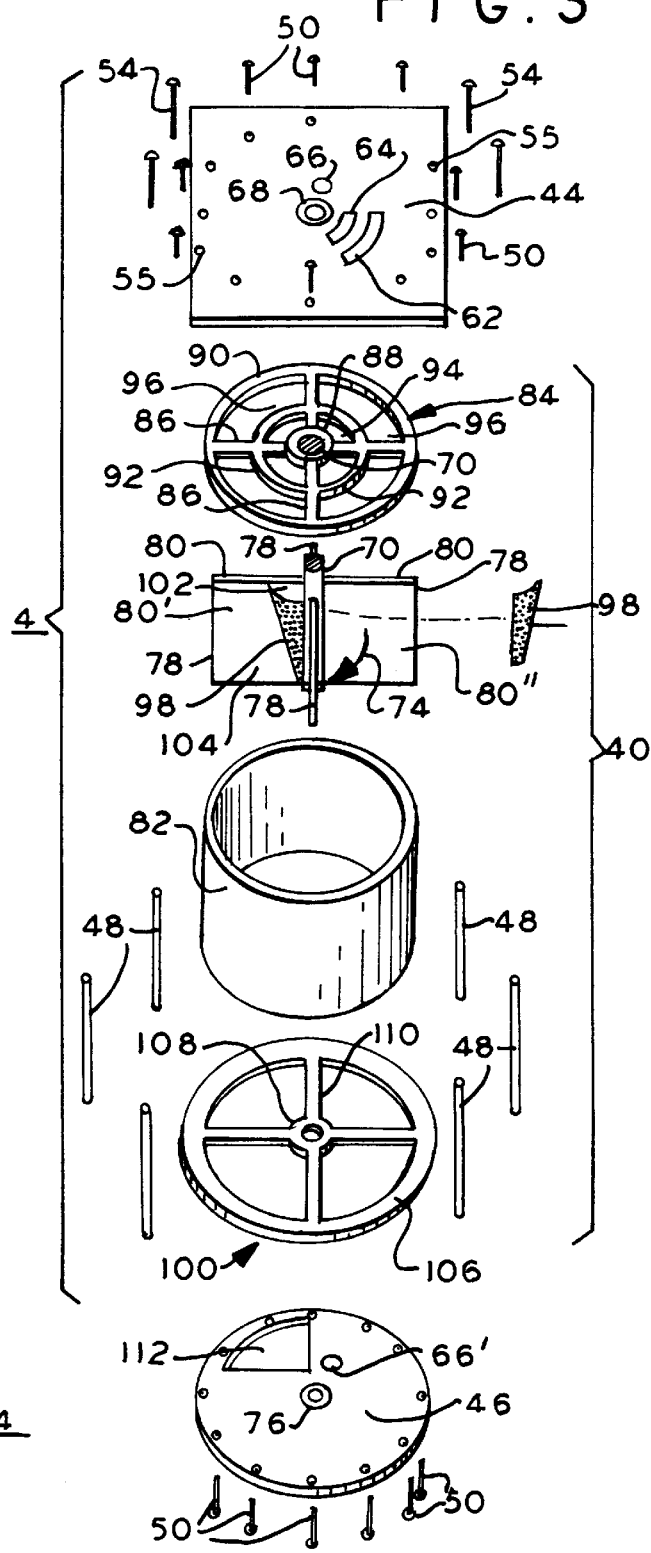
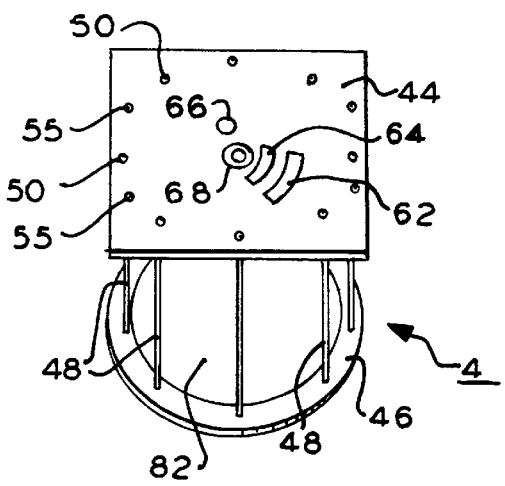
FIG. 1
FIG. 3
FIG. 2

VACUUM ROTARY FILTRATION APPARATUS

This invention relates to vacuum filtration apparatus, and more particularly, to rotary apparatuses.

Numerous rotary filtration systems and devices are known. For example, U.S. Pat. No. 334,777 discloses a shoddy purifier for removing dust from shoddy. A revolving perforated shell supports and is about a cylinder placed within a casing having inlet and discharge openings, Dust is sucked from the shoddy through the perforated cylinder. The shoddy is forced into the casing and air sucked from within the perforated shell removing dust from the shoddy exterior the shell.

U.S. Pat. No. 2,528,877 discloses a machine with a perforated casing, impeller blades and a perforated rotating drum for filling cushions and pillows with are free fibrous material. The impeller blades aid in directing material toward the perforated drum. The perforated drum rotates in the perforated casing having a hopper on one side and a nozzle in tangential relation therewith. Suction means is in communication through the perforations causing fibrous material to be fed to arms between the perforated drum and perforated casing and to be fed by the arms through the nozzles while removing air from the fibrous material.

German patent No. 1,197,735 illustrates a material conveyance and filtration system having an input, a rotary separator screen, and an output in fluid communication with filter bags. The system appears to operate under a vacuum created by a blower.

U.S. Pat. No. 5,509,379 discloses an animal litter box which automatically separates waste material from animal litter via a rotating screen.

U.S. Pat. No. 4,522,726 discloses a separation device including at least one rotating member which is internally divided into a plurality of working stations.

U.S. Pat. Nos. 3,409,139, 4,447,249, 4,529,509, 4,551,248, 5,073,264 and 5,078,878 disclose rotary vacuum filtering drums and/or screens for filtering fibrous or particulate material. The '249 patent discloses a wool separator having a rotary screen which includes about its periphery a series of radially spaced vanes. The '248 and '264 patents disclose partitioned drum/screen systems. In particular, the '248 patent discloses a rotary drum vacuum filter having a pair of conically shaped support members.

U.S. Pat. No. 5,106,488 discloses a clone member for separating coarse particles and a filter device inside the cyclone member for separation of fine particles.

Other vacuum conveyance systems including vacuum blowers, pipe systems, filtering bag houses and related devices are presently in wide use.

However, none of the above are directed to the problem of conveying moisture laden particulate material through a pipe system and providing structure for filtering fine particles from the moisture laden material and then separating the higher volume solid material into a receptacle. The problem of moisture laden material is that it tends to clog the prior art vacuum conveyance and filtration systems.

The present inventor recognizes a need for a vacuum (the term being contemplated herein to encompass any negative pressure differential) conveyance system for moisture laden particulate material.

A vacuum operated rotary filtration apparatus according to the present invention for separating dust particles from solid material particles comprises a housing and a chamber member rotatably secured to the housing for forming a plurality of separate rotatable compartments each in substantial fluid isolation from the other. Means are provided for rotating the chamber member. Screen means are secured to the chamber member for dividing each of the compartments into radially aligned corresponding inner and outer subcompartments. Means couple suction mean to the housing located so as to create a vacuum successively in each of a selected one of the subcompartments one subcompartment at a time during rotation of the chamber member. Material inlet means are coupled to the housing and to the other of said subcompartments corresponding to the selected one subcompartment for supplying solid material particles into the other selected subcompartment in response to the vacuum in that selected one subcompartment whereby during rotation of the chamber member, the inner and outer radially aligned corresponding subcompartments are successively in simultaneous communication with a respective suction means and inlet means. Discharge port means are coupled to the housing and successively coupled to a second of the other subcompartments different than the selected other subcompartment for discharging filtered solid material therefrom during rotation of the chamber member.

In one aspect of the present invention, the chamber means comprises a plurality of radially outwardly extending vanes secured to a central shaft, an outer cylinder secured to the vanes radially outwardly distal the shaft, and top and bottom face plates secured to the vanes and cylinder, the housing including bearing means for rotatably securing said shaft.

In a further aspect, the screen means comprises a screen member comprising a segment of a cone secured in each of the compartments.

In a still further aspect, the house includes top and bottom plates, the top face plate and bottom face plate are respectively closely spaced to the top and bottom plates with a gap sufficiently small so as to effectively form a fluid seal therebetween.

FIG. 1 is a side elevation diagrammatic view, partially in section, of a vacuum filtration conveyance system according to an embodiment of the present invention;

FIG. 2 is a perspective view of a rotary particle separator employed in the embodiment of FIG. 1;

FIG. 3 is an exploded perspective view of the separator of FIG. 2;

Figure 4:
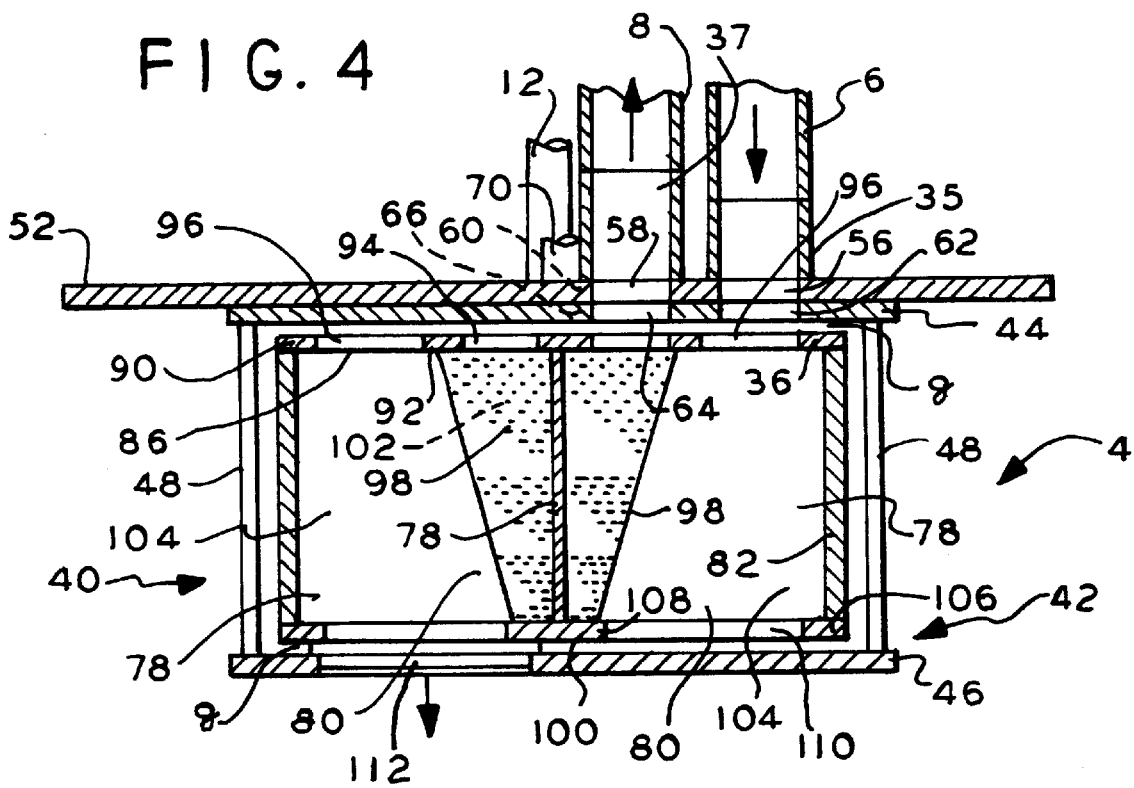
FIG. 4 is an elevation sectional view of the separator of FIG. 2.

In FIG. 1, vacuum particulate material conveying system 2 comprises a rotary separator 4, a material intake hose 6 coupled to the separator 4 intake port, an exhaust pipe 8 coupled to a separator 4 exhaust port for coupling a relatively low pressure to the exhaust port bore, a blower 10 coupled to the pipe 8 for creating a relatively low air pressure in pipe 8, an air inlet pipe 12 coupled to an inlet port of the separator 4 and containing air pressurized from blower 10, an adjustable support mechanism 14 for supporting and manually guiding hose 6 into a source 16 of solid particulate material 16' such as animal bedding, by way of example. A handle 18 is connected to the hose 6 to assist the manual placement of the pipe 6 into material 16'. A chute section 20 guides separated material from the separator 4 discharge port into hoppers 22. A plurality of animal cages 24 are conveyed by conveyer 26 into position for receiving the filtered bedding material from the hoppers 22.

The term particulate material as employed herein and in the claims is intended to include particles of fungible material such as animal bedding, discrete parts such as screws, nuts, bolts and other hardware in relatively small particle sizes, fluid-like materials such as powders or grannular substances, e.g., salt and so on which tend to flow in fluid fashion. The term fluid as used herein and in the claims is intended to include powder and grannular materials such as described above, liquids and gases.

Exhaust pipe 8 is connected to bag house 28 manifold 32. A plurality of coarse filtration filter bags 30 of known construction are fluid coupled to manifold 32. A high efficiency particle air filter (HEPA), a fine particle filter 34 is fluid coupled to receive coarse filtered air flow from the bags 30. Blower 10 draws the air from manifold 32 through the bags 30 and filter 34. The filtered air from blower 10 is exhausted to pipe 12 to either ambient atmosphere or to pressurized air input pipe 12 of separator 4. Preferably in this embodiment, the filtered exhaust a s supplied to the separator 4 from input pipe 12.

The action of blower 10 provides a pressure differential between pipes 6 and 8. While a vacuum may be induced in pipe 8, what is important is the presence of a pressure differential between pipes 6 and 8 and which may be exhibited by a positive pressure in pipes 6 and 8.

In FIGS. 3 and 4, separator 4 comprises a separator rotor assembly 40 rotatably secured to housing 42. The housing 42 comprises a top plate 44 and a bottom plate 46. The top plate 44 is secured to the bottom plate 46 by standoffs 48 and screws 50. The top plate 44 is rectangular sheet metal and the bottom plate 46 is preferably a circular or square (circular being shown) sheet metal member. A further plate 52, FIG. 4, (not shown in FIG. 3) is secured to top plate 44 by screws 54 (not shown in FIG. 4) via threaded apertures 55 in plate 44. In FIG. 4, a manifold 35 (see FIG. 5) is coupled to bores 56 and 62. The manifold 35 receives and secures hose 6 in fluid communication with respective through bores 56 and 62. A manifold 37 receives and secures pipe 8 in fluid communication with through bores 58 and 64. Pipe 12 is connected to a fitting (not shown) on plate 52 in fluid communication with through bore 60 in plate 52.

The rotor assembly top plate 44 has two radially aligned through bores 62 and 64. The bore 62 is about the same diameter as bore 56 and the bore 64 is about the same diameter as bore 58. The bores 62 and 64 are in axial alignment and in fixed relationship with the bores 56 and 58, respectively. Plate 44 has a further through bore 66 in axial fixed alignment with the bore 60 in plate 52 and about the same diameter. An annular bearing 68 is secured centrally in plate 44 through which shaft 70 passes and is journalled. Shaft 70 is rotatably driven in direction 74, FIG. 3, by motor 72 (FIG. 1) secured to plate 52 (by means not shown).

While a pressurized air source is preferred and shown connected to bore 66 in top plate 44, this bore in the alternative may be open to ambient atmosphere. Since a relatively low pressure is applied to the interior of separator 40 via manifold 37 and bores 58, 64 via pipe 8, the ambient atmosphere supplies a sufficiently high pressure for discharging screened solid material in a manner to be described. However, such ambient atmospheric pressure may also be applied through discharge port 112 in bottom plate 46.

The separator rotor 40, FIG. 3, comprises a preferably stainless steel chamber member formed by a preferably stainless steel shaft 70 journalled in thrust bearing 76 in steel bottom plate 46 and in bearing 68 in steel top plate 44 of housing 42. The chamber member includes preferably four, and preferably stainless steel, sheet vanes 78 secured to shaft 70 forming four equal volume quadrant chambers or compartments 80. More or fewer vanes may be used according to a given implementation.

The vanes may be welded or otherwise fastened to the shaft 70 and emanate radially outwardly in oppening aligned pairs lying in right angle planes. A preferably stainless steel circular cylinder 82 is welded or otherwise attached to the radial outward edges of the vanes 78, forming a radial peripheral air tight enclosure for the compartments 80 at the junction therebetween.

An apertured preferably stainless steel top face plate 84, which is optional, is secured to the upper edges of the vanes and the upper rim edge of the cylinder 82 in air tight relation. The shaft 70 passes through a central opening in the plate 84. The plate 84 has four radially extending ribs 86 extending between a central annular rib 88 and an outer preferably circular rib 90. Four circular segment ribs 92 of like dimensions are connected to and between adjacent ribs 86 medially the respective central and outer annular ribs 88 and 90.

The ribs 86, 88 and 92 form four preferably identical first inner radial openings 94. The ribs 90, 92 and 86 form four preferably identical second outer radial openings 96. The openings 94 permit fluid communication from bores 58 and 64 into an aligned compartment 80. As the shaft 70 rotates, the different compartments 80 successively rotate into fluid communication with the bore pairs 58, 64 and 56, 62 in the corresponding plates 52 and 44. These bores simultaneously communicate with each compartment successively as the rotor assembly 40 rotates.

A truncated preferably conical segment coarse screen 98, is secured by tack welding or bonding to the shaft 70 and top and bottom face plates 84 and 100, respectively, in each compartment 80. The screens 98 are preferably identical and form the compartments 80 into radially inner and outer respective subcompartments 102 and 104. Each inner subcompartment 102 is aligned with radially inner opening 94 of the top face plate 84.

Each inner subcompartment 102 also aligns with the bores 58 and 64 in plates 44 and 52 through opening 94 during rotation, respectively, when the compartment 80 thereof is so aligned with these bores, forming an exhaust port. Each inner subcompartment thus successively aligns with the bores 58 and 64 as the shaft 70 rotates. The screens have a perforation size sufficiently large to permit relatively small, e.g., dust, particles to pass therethrough and sufficiently small to preclude large solid particles from passing therethrough. The screens 98 form a relatively coarse filter.

Each outer subcompartment 104 is aligned with a corresponding opening 96 in the top face plate 84. Each outer subcompartment 104 successively aligns with the bores 56 and 62 in the respective plates 52 and 44 during rotation through its corresponding opening 96 forming an inlet port. Thus the outer subcompartments 104 successively align with the bores 56 and 62 during rotation.

The inner subcompartments 102 radially inward of the screens 98 thus form an exhaust volume created by blower 10 (FIG. 1) and the outer subcompartments 104 form an intake volume for receiving solid particulate material, dry or moisture laden, from hose 6. This material is drawn into the subcompartment 104 by the relatively low pressure created by the blower 10 in pipe 8 in the inner subcompartment 102. Dust or other small foreign particles not desired in the material 16' is thus successively removed from the material 16' through the different compartment screens 98 into the exhaust pipe 8 in response to the action of the blower 10 (FIG. 1) and rotation of the rotor assembly 40. The remaining larger solid particulate material 16' accumulates in the outer subcompartments 104 of each compartment 80 during rotation.

It should be understood, that while the inner subcompartment 102 is an exhaust volume and the outer subcompartment is an intake volume, the inverse may also be applicable in certain implementations. Here, the inner subcompartment forms an intake volume and the outer subcompartment forms an exhaust volume.

An optional bottom spoke-like face plate 100 comprises an outer circular rim 106 connected to an inner hub 108 by four radial spoke-like ribs 110. The rim 106, hub 108 and ribs 110 form four open quadrants aligned with the respective compartments 80 of the cylinder 82, vanes 78 and shaft 70. The shaft 70 passes through the hub 108 and is fixedly sealingly secured thereto. The rim 106 is fixedly alingly secured to the cylinder 82. The vanes 78 are fixedly sealingly secured to the ribs 110.

Bottom plate 46 has a solid material discharge opening 112. This opening is for discharging accumulated large particles in the outer subcompartment 104 through the corresponding opening in the bottom face plate 100 formed by the ribs thereof. Bottom plate 46 also has a discharge port 66' aligned in the same subcompartment as port 66. The port 66' discharges dust laden the air in the inner subcompartment due to the relatively high pressure applied through port 66.

Also, a high pressure fluid flow into the inner subcompartment 102 through port 66 serves to clean the screens 98 of solid particles clinging thereto on the outer subcompartment side. This is due to the inclined angle of the screens relative to the axis of flow through the port 66.

The discharge port 112 is in successive simultaneous fluid communication with the same compartment 80 as the port 66 in the top plate 44 as the compartments rotate. However, this alignment is not essential. The port 66 may be aligned with a different upstream compartment 80 (but downstream from the openings 62 and 64 in the top plate 44). For example, in FIG. 3, the port 66 may be aligned with a compartment 80, which is intermediate the downstream compartment 80' then aligned with the discharge port 112 and the upstream compartment 80' then aligned with the pipe 8 and hose 6. The higher pressure of the pressurized intermediate compartment 80 in this case remains as compartment 80 rotates into alignment with the discharge port 112. When aligned, the solid material in that compartment 80 outer subcompartment 104, having an elevated relative pressure, is discharged through port 112 assisted by that elevated pressure.

The rotor assembly 40 top face plate 84 and the bottom face plate 100 are spaced from the respective housing 42 top plate 44 and bottom plate 46 by a small gap g, FIG. 4, preferably about 0.005 inches wide. This gap is sufficiently small to preclude substantial fluid flow, e.g., air or other gas or fluid, therethrough due to pressure differentials between the compartments and subcompartments and preclude particles of material from flowing therein. The gaps g provide minimal friction between the respective rotating top and bottom face plates 84 and 100 and the stationary top and bottom plates 44 and 46.

By omitting the top face plate 84 and bottom face plate 100, the lower and upper edges of the vanes 78 and cylinder 82 are spaced gap g from the housing top plate 44 and bottom plate 46. However, the top face plate is preferred to provide sealing action at the top of the screens 98 whose lower most end may be secured to the shaft 70 in place of the bottom face plate.

Preferably, the rotor assembly 40 is rotated about 18 to 40 RPM. In operation, the inlet pipe 6, FIG. 1, is manually placed in a source of dry particulate material 16, e.g., animal bedding for cages, such as cages 24, FIG. 1, for feeding material 16' into hose 6. The material 16', whether moisture laden or dry, is drawn into the hose 6 by the relatively low pressure in the inner subcompartment 102 created by the blower 10 (FIG. 1) through the screen 78 and outer subcompartment 104.

The rotor assembly 40 meanwhile is rotating in direction 74, FIG. 3. As the rotor rotates, the inner subcompartments 102 successively communicate with the exhaust pipe 8 and the corresponding outer subcompartment 104 communicates simultaneously with the intake hose 6, drawing material 16' into the outer subcompartment 104. The screens 98 separate dust or other fine particles from the material 16' in the outer subcompartment in response to the pressure differential with the inner subcompartment, the remainder of which material stays in the outer subcompartment. As the rotor continues to rotate, the pipe 8 and hose 6 are fluid decoupled from those subcompartments. The inner subcompartment then downstream successively receives a positive pressure through top plate 44 port 66. This pressure assists in cleaning the screens 98 in conjunction with the discharge port 66' in the bottom plate 46. This material in the outer subcompartment 104 is then fed to the cages 24, FIG. 1, as described above, as clean substantially dust free bedding.

In the alternative, other material are discharged to appropriate receivers. Also, port 66 may be aligned with discharge port 112.

In the meantime the dust laden air is fed to the bag house where the dust is removed by the filter bags 30 and HEPA filter 34. The resulting clean filtered air may then be returned to the separator 4 or exhausted to the ambient atmosphere.

Figure 5:
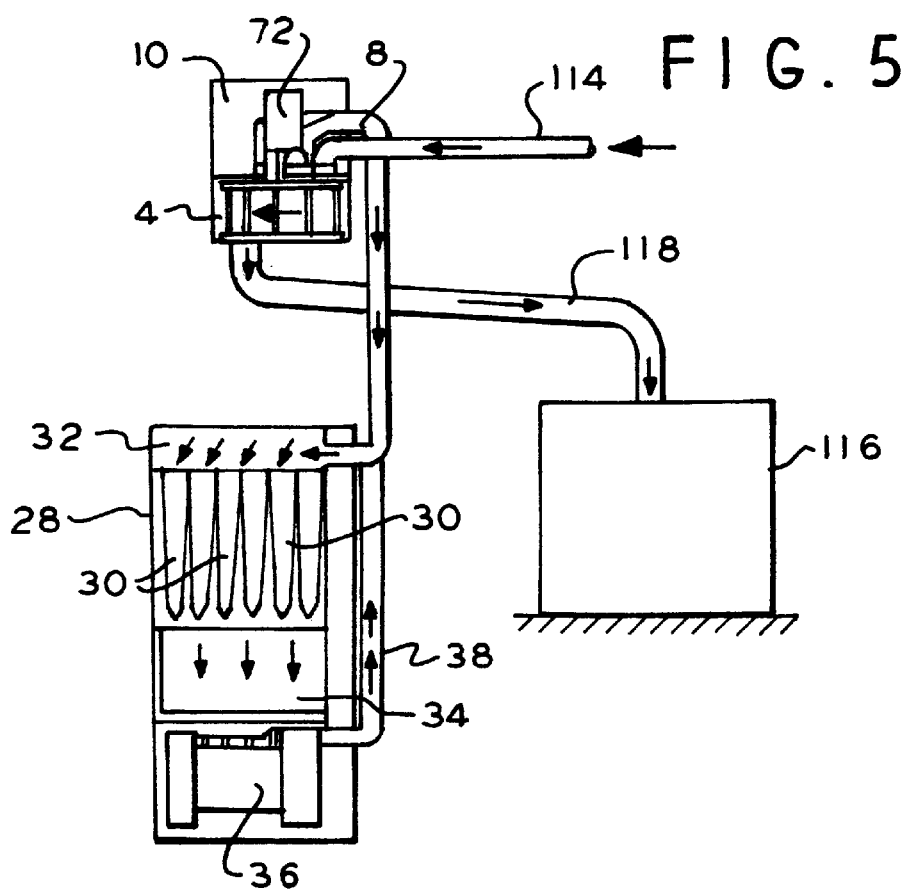
FIG. 5 is a second embodiment of a vacuum filtration conveyance system of the present invention.

In FIG. 5, an alternative embodiment includes a separator 4, blower 10, drive motor 72, exhaust pipe 8, bag house 28 and pressurized pipe 12 identical to elements of like reference numerals described in connection with FIGS. 1–4. The difference is inlet conduit 114 which replaces the inlet hose 6 of FIG. 1. The conduit 114 carries moisture laden particulate material, e.g., soiled animal cage bedding material. The solid material contains dust and soiled larger solid particles. The coarse dust is first separated by the separator 4 as before and the remaining moisture laden solid particles are then fed from the separator 4 to a compactor 116 via discharge pipe 118. Thus, in the system described moisture laden solid particles are readily conveyed without clogging the system.

It will occur to one of ordinary skill that various modifications may be made to the describe embodiments which are given by way of illustration and not limitation. For example, while a gap g is shown for preferably providing the sealing action between the rotor assembly 40 and the stationary housing 42, other sealing arrangements may be provided including solid seals between the moving and stationary elements. Also, while the inlet bore 62 and exhaust bore 64 in the housing top plate 44 are shown radially aligned this is not essential.

What is essential is that the housing top plate 44 inner bore 64 be aligned in successive fluid communication with each inner subcompartment 102 and the outer bore 62 is in successive aligned fluid communication with each outer subcompartment 104. Also, the relatively high pressure inlet port 66 is optional as the solid material will discharge by gravity because an increased compartment pressure is induced by the coupling of the port 112 with the ambient atmospheric pressure, the separator 4 being oriented vertical in the FIGS. Also, the separator 4 rotor assembly 40 may be other shapes in addition to the preferred circular cylindrical shape, e,g,. oval or a polygon. By way of further example, while the inner subcompartment is shown as the exhaust volume and the outer as the inlet, these may be reversed according to a given implementation.

The thickness of the vanes 78 and ribs 86, 88, 90, 92 and 110 determine the sealing action as well as the gap g. The greater the rib width the greater the pressure differential supported by the sealing action.

What is intended is that the invention is as defined in the appended claims.

What is claimed is:

1. A pressure differential operated rotary filtration apparatus for separating relatively fine particles from relatively coarse particles comprising:

a housing;

a chamber member rotatably secured to said housing for forming a plurality of separate rotatable compartments each in substantial fluid isolation from the other;

means for rotating said chamber member;

screen means secured to said chamber member for dividing each said compartments into radially aligned corresponding inner and outer subcompartments;

means for coupling pressure applying means to the housing and located so as to create a fluid flow successively to each of a selected one of said inner and outer subcompartments from the other of said inner and outer subcompartments one subcompartment at a time during rotation of said chamber member;

material inlet means coupled to the housing and to a selected other of said inner and outer subcompartments corresponding to the selected one subcompartment for supplying said coarse particles into the selected other subcompartment in response to the fluid flow to that selected one subcompartment form said other subcompartment whereby during rotation of said chamber member, the inner and outer substantially radially aligned corresponding subcompartments being successively in simultaneous communication with a respective relatively low pressure means and a relatively high pressure inlet means; and discharge port means coupled to said housing and successively coupled to a second of said other subcompartments different than the selected other subcompartment for discharging filtered solid material therefrom during rotation of said chamber member.

2. The apparatus of claim 1 wherein the means for creating fluid flow comprises material conveying and suction means coupled to said means for coupling the pressure applying means for conveying material to said inlet means and for causing said fluid flow.

3. The apparatus of claim 1 including discharged material conveying means coupled to said discharge means for conveying said discharged material.

4. The apparatus of claim 1 wherein said chamber means comprises a plurality of radially outwardly extending vanes secured to a central shaft, an outer cylinder secured to said vanes radially outwardly distal said shaft, and top and bottom face plates secured to said vanes and cylinder, said housing including bearing means for rotatably securing said shaft.

5. The apparatus of claim 4 wherein said screen means comprises a screen member comprising a segment of a cone secured in each said compartments.

6. The apparatus of claim 5 wherein the cone segment is truncated with its apex region adjacent to said bottom face plate.

7. The apparatus of claim 1 including means for providing approximately ambient atmospheric pressure in each compartment aligned with said discharge port.

8. The apparatus of claim 4 wherein the housing includes top and bottom plates, said top face plate and bottom face plate are respectively closely spaced to said top and bottom plates with a gap sufficiently small so as to effectively form a fluid seal therebetween.

9. The apparatus of claim 1 including pressure means for applying fluid pressure to said screens for cleaning said screens.

10. The apparatus of claim 9 wherein said pressure means includes means for applying a first fluid under pressure to one of said subcompartments while simultaneously exhausting said first fluid from said latter one subcompartment.

11. A pressure differential operates rotary filtration apparatus for separating relatively fine particles from relatively coarse particles comprising:

a housing;

a chamber member secured for rotation to said housing including a plurality of separate rotatable compartments each in substantial fluid isolation from the other;

means for rotating said chamber member;

a filtering screen secured to the member in each compartment for dividing each compartment into radially aligned corresponding inner and outer subcompartments;

means for coupling pressure applying means to the housing to cause fluid flow successively from each inner subcompartment to an outer subcompartment one subcompartment at a time during said rotation of said chamber member;

material inlet means coupled to the housing and corresponding to a first outer subcompartment, said first outer subcompartment corresponding to the inner subcompartment exhibiting a relatively high pressure for supplying said coarse particles into the first outer subcompartment in response to a relatively low pressure in the corresponding inner subcompartment; and a discharge port in the housing communicating with an outer subcompartment of a compartment different than the compartment coupled to said suction means and inlet means.

12. The aparatus of claim 11 including means for substantially fluid sealing each said compartment relative to the others of said compartments.

13. The apparatus of claim 12 wherein said fluid sealing means comprises spacing said chamber member from said housing a sufficiently small gap so as to effectively form a fluid seal therebetween.

14. The apparatus of claim 11 including filter bag means coupled to the blower means for receiving and filtering particles from air supplied from said inner subcompartments.

15. The apparatus of claim 11 wherein the chamber member includes a top face plate, a bottom face plate and a central shaft, each said filtering screen being secured to said top face plate, bottom face plate and shaft.

16. The apparatus of claim 15 wherein the top and bottom face plates each includes a plurality of openings therein, each top plate opening corresponding to and being in communication with a different first inner and first outer subcompartment and each bottom face plate opening being communication with and corresponding to an outer subcompartment different than said first outer subcompartment.

17. The apparatus of claim 16 wherein said top face and bottom plates are arranged to be in sealing engagement with said housing to substantially fluid isolate each said subcompartments from one another.

18. The apparatus of claim 11 wherein the chamber means comprises a central shaft rotatably secured to said housing, a plurality of vanes extending radially outwardly said shaft and terminating at an outer edge, said vanes each having radially extending upper and lower edges, an outer cylinder sealingly secured to each said vane at its outer edge, and means for substantially fluid sealing the upper and lower edges of said vanes to said housing.

19. The apparatus of claim 18 wherein said means for sealing the edges includes top and bottom face plates secured to and corresponding to the respective vane upper and lower edges, said housing including top and bottom housing plates, said top and bottom face plates being spaced from and corresponding to the housing respective top and bottom plates a sufficiently small gap so as to effectively form a fluid seal therebetween.

20. A pressure differential operated rotary filtration apparatus for separating relatively fine particles from relatively coarse particles comprising:

a top plate having a pair of through openings, a first inner of said openings being on a circumferential line radially inwardly relative to a second outer opening;

a bottom plate including means for securing the bottom plate to the top plate, said bottom plate having a material discharge port;

a shaft rotatably secured to the top and bottom plates;

means for rotating the shaft coupled to one of said top and bottom plates;

a chamber member secured to and rotatable with the shaft and forming a plurality of separate annularly spaced compartments, said member and housing including means arranged such that each compartment is in substantial fluid isolation from the other;

a filtering screen secured to the member in each compartment for dividing each compartment into radially aligned corresponding inner and outer subcompartments, said subcompartments being positioned so that an inner one of a first of said aligned subcompartments is in fluid communication with the first inner through opening and the other outer one of a second of said aligned subcompartments is in simultaneous fluid communication with the second through opening while said discharge port is in simultaneous fluid communication with a further subcompartment different than the first and second aligned subcompartments for discharging material received therein;

means for creating a relatively low pressure in one of said first and second inner and outer through openings; and material inlet means coupled to the other of said first and second inner and outer through openings for drawing material into said other of said first and second openings in response to said created relatively low pressure in the one of said first and second inner and outer openings.

21. The apparatus of claim 20 including means for substantially fluid isolating each said compartment from the other compartments, said means for fluid isolating comprising spacing said chamber member from said top and bottom plates a distance sufficiently small so as to form a gap exhibiting substantially a fluid seal between each said compartments while permitting said chamber member to rotate relative to said top and bottom plates with negligible friction.

* * * * *